United States Patent
Morikawa

(10) Patent No.: US 12,154,184 B2
(45) Date of Patent: *Nov. 26, 2024

(54) CONTROL DEVICE, PROGRAM, AND CONTROL METHOD

(71) Applicant: TOYOTA JIDOSHA KABUSHIKI KAISHA, Toyota (JP)

(72) Inventor: Hirohiko Morikawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/396,105

(22) Filed: Dec. 26, 2023

(65) Prior Publication Data

US 2024/0127386 A1   Apr. 18, 2024

Related U.S. Application Data

(63) Continuation of application No. 17/387,360, filed on Jul. 28, 2021, now Pat. No. 11,893,652.

(30) Foreign Application Priority Data

Oct. 8, 2020 (JP) .................................. 2020-170806

(51) Int. Cl.
```
G06Q 50/40      (2024.01)
B60N 2/00       (2006.01)
G01S 19/17      (2010.01)
G01S 19/42      (2010.01)
```
(52) U.S. Cl.
CPC ............. *G06Q 50/40* (2024.01); *B60N 2/002* (2013.01); *G01S 19/17* (2013.01); *G01S 19/42* (2013.01)

(58) Field of Classification Search
CPC .. G06Q 50/30; G06Q 10/06311; B60N 2/002; G01S 19/17; G01S 19/42; H04L 67/12; B60R 16/02; H04W 4/40
USPC ........................................................ 455/404.2
See application file for complete search history.

(56) References Cited

U.S. PATENT DOCUMENTS

| | | | |
|---|---|---|---|
| 11,893,652 B2 * | 2/2024 | Morikawa | ............... G01S 19/17 |
| 2019/0283706 A1 | 9/2019 | Suzuki et al. | |
| 2020/0111370 A1 | 4/2020 | Dyer et al. | |
| 2020/0271467 A1 | 8/2020 | Yoshida et al. | |

(Continued)

FOREIGN PATENT DOCUMENTS

| | | |
|---|---|---|
| CN | 109895597 A | 6/2019 |
| CN | 111081051 A | 4/2020 |

(Continued)

OTHER PUBLICATIONS

U.S. Appl. No. 17/387,360, filed Jul. 28, 2021, Hirohiko Morikawa.

*Primary Examiner* — Tanmay K Shah
(74) *Attorney, Agent, or Firm* — Dinsmore & Shohl LLP

(57) ABSTRACT

A control device that is communicably connected to a vehicle includes a control unit. The control unit executes acquisition of sensor information from a sensor provided in the vehicle, determination of whether the vehicle is parked based on the sensor information, determination of whether a user is staying in the vehicle based on the sensor information, and estimation that the user is staying in the vehicle when a parking time of the vehicle exceeds a first reference value and a staying time of the user exceeds a second reference value.

20 Claims, 7 Drawing Sheets

(56) References Cited

U.S. PATENT DOCUMENTS

2022/0001722 A1  1/2022 Liu et al.
2022/0114691 A1  4/2022 Morikawa

FOREIGN PATENT DOCUMENTS

| CN | 111409550 A | 7/2020 |
| CN | 111612184 A | 9/2020 |
| JP | 2003-162784 A | 6/2003 |
| JP | 2022-525263 A | 5/2022 |
| WO | 2020/187067 A1 | 9/2020 |

\* cited by examiner

FIG. 5

| VEHICLE ID | USER ID | SENSOR INFORMATION OF VEHICLE | SENSOR INFORMATION OF USER TERMINAL |
|---|---|---|---|
| V01 | U01 | POSITION L01, SEATING SENSOR ON | POSITION L02 |
| ... | ... | ... | ... |

FIG. 6

IN-VEHICLE STAY
SUPPORT INFORMATION

○ CONGESTION LEVEL

EVALUATION CENTER A: HIGH

EVALUATION CENTER B: LOW

○ DISTRIBUTION LOCATION OF
   IN-VEHICLE STAY KIT

EVALUATION CENTER B

CONTROL DEVICE, PROGRAM, AND CONTROL METHOD

CROSS-REFERENCE TO RELATED APPLICATION

This application is a continuation application of U.S. Ser. No. 17/387,360 filed Jul. 28, 2021, which claims priority to Japanese Patent Application No. 2020-170806 filed on Oct. 8, 2020, both of which are incorporated herein by reference in its entirety.

BACKGROUND

1. Technical Field

The present disclosure relates to a control device, a program, and a control method.

2. Description of Related Art

In the prior art, there is known a technique of obtaining earthquake damage information when an earthquake occurs and notifying an appropriate evacuation route map to an evacuation site for each district (for example, Japanese Unexamined Patent Application Publication No. 2003-162784 (JP 2003-162784 A)).

SUMMARY

Some people stay in vehicles without evacuating to an evacuation center. It is not easy to obtain information on people who are staying in vehicles. For this reason, it may not be possible to provide such people with information related to evacuation and support.

An object of the present disclosure made in view of such circumstances is to provide a control device, a program, and a control method capable of finding a person who is staying in a vehicle with high accuracy.

A control device according to an embodiment of the present disclosure is a control device that is communicably connected to a vehicle, and includes a control unit. The control unit executes: acquisition of sensor information from a sensor provided in the vehicle; determination of whether the vehicle is parked based on the sensor information; determination of whether a user is staying in the vehicle based on the sensor information; and estimation that the user is staying in the vehicle when a parking time of the vehicle exceeds a first reference value and a staying time of the user exceeds a second reference value.

A program according to an embodiment of the present disclosure causes a computer, as a control device that is communicably connected to a vehicle, to execute: acquisition of sensor information from a sensor provided in the vehicle; determination of whether the vehicle is parked based on the sensor information; determination of whether a user is staying in the vehicle based on the sensor information; and estimation that the user is staying in the vehicle when a parking time of the vehicle exceeds a first reference value and a staying time of the user exceeds a second reference value.

A control method according to an embodiment of the present disclosure is a control method executed by a control device that is communicably connected to a vehicle. The control method includes: acquiring sensor information from a sensor provided in the vehicle; determining whether the vehicle is parked based on the sensor information; determining whether a user is staying in the vehicle based on the sensor information; and estimating that the user is staying in the vehicle when a parking time of the vehicle exceeds a first reference value and a staying time of the user exceeds a second reference value.

According to the control device, the program, and the control method according to the embodiments of the present disclosure, it is possible to find a person who is staying in the vehicle with high accuracy.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a diagram showing a data structure of a sensor information database (DB);

FIG. 6 is a diagram showing in-vehicle stay support information displayed on a user terminal.

DETAILED DESCRIPTION OF EMBODIMENTS

Figure 1:
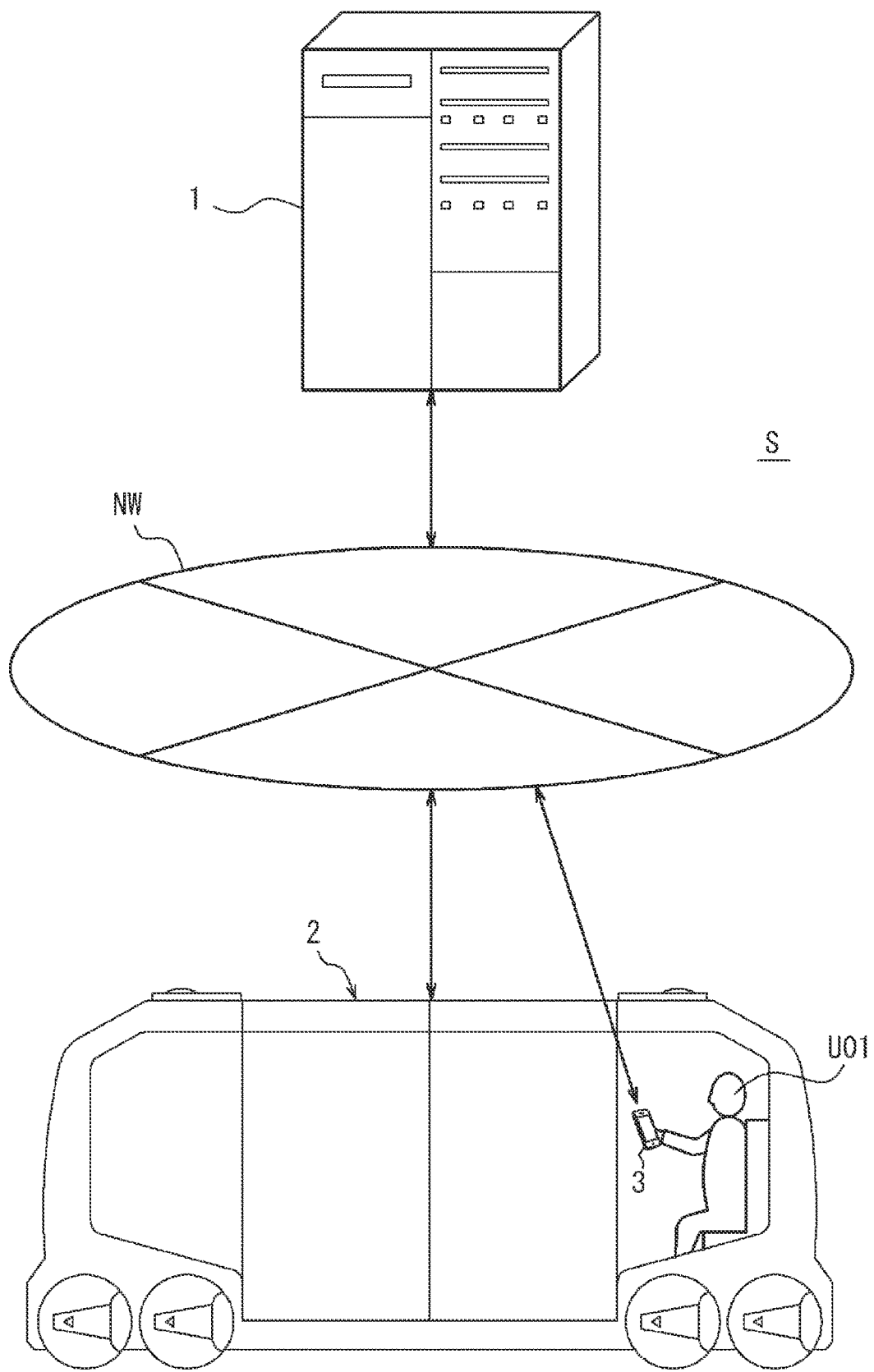
FIG. 1 is a schematic diagram of an information processing system.

FIG. 1 is a schematic view of an information processing system S according to the present embodiment. The information processing system S includes a control device 1, a vehicle 2, and a user terminal 3 that are communicably connected to each other via a network NW. A user U01 is on board the vehicle 2. The network NW includes, for example, a mobile communication network and the Internet.

In FIG. 1, for convenience of explanation, one control device 1, one vehicle 2, and one user terminal 3 are illustrated. However, the numbers of the control devices 1, the vehicles 2, and the user terminals 3 are not limited to the above. For example, the processes executed by the control device 1 according to the present embodiment may be executed by a plurality of the control devices 1 disposed in a distributed manner. A plurality of the user terminals 3 may be operated by the user U01.

The outline of the processes executed by the control device 1 according to the present embodiment will be described. The control device 1 executes acquisition of sensor information from a sensor 24 provided in the vehicle 2, determination of whether the vehicle 2 is parked based on the sensor information, and determination of whether the user U01 is staying in the vehicle 2 based on the sensor information. When a parking time of the vehicle 2 exceeds a first reference value and a staying time of the user U01 exceeds a second reference value, the control device 1 further executes estimation that the user U01 is staying in the vehicle 2. With this configuration, the control device 1 determines whether the user is staying in the vehicle from two viewpoints related to an in-vehicle stay, that is, the parking time and the staying time. Therefore, the person who is staying in the vehicle can be found with high accuracy.

The control device 1 is installed in a facility such as a data center. The control device 1 is, for example, a server belonging to a cloud computing system or other computing systems. As an alternative example, the control device 1 may be mounted on the vehicle 2.

Figure 2:
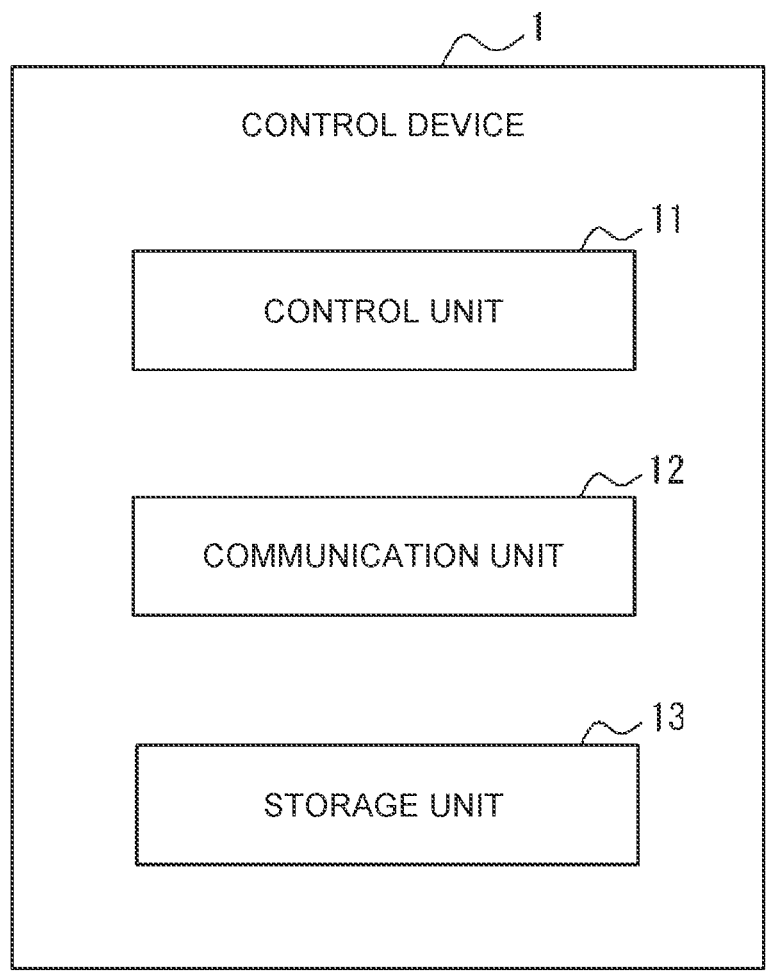
FIG. 2 is a block diagram showing a configuration of a control device.

The internal configuration of the control device 1 will be described in detail with reference to FIG. 2.

The control device 1 includes a control unit 11, a communication unit 12, and a storage unit 13. The components of the control device 1 are communicably connected to each other via, for example, a dedicated line.

The control unit 11 includes, for example, one or more general-purpose processors including a central processing unit (CPU) or a micro processing unit (MPU). The control unit 11 may include one or more dedicated processors specialized for a specific process. The control unit 11 may include one or more dedicated circuits instead of including the processor. The dedicated circuit may be, for example, a field-programmable gate array (FPGA) or an application-specific integrated circuit (ASIC). For example, the control unit 11 may include an electronic control unit (ECU).

The communication unit 12 includes a communication module conforming to one or more wired or wireless local area network (LAN) standards for connecting to the network NW. The communication unit 12 may include a module conforming to one or more mobile communication standards such as the long term evolution (LTE), the fourth generation (4G), or the fifth generation (5G). The communication unit 12 may include a communication module conforming to one or more short-range communication standards or specifications including Bluetooth (registered trademark), Air Drop (registered trademark), infrared data association (IrDA), ZigBee (registered trademark), FeliCa (registered trademark), or radio frequency identifier (RFID). The communication unit 12 transmits and receives various types of information via the network NW.

The storage unit 13 includes a semiconductor memory, a magnetic memory, an optical memory, or combinations of at least two of them. However, the disclosure is not limited to this. The semiconductor memory is, for example, a random access memory (RAM) or a read-only memory (ROM). The RAM is, for example, a static random access memory (SRAM) or a dynamic random access memory (DRAM). The ROM is, for example, an electrically erasable programmable read-only memory (EEPROM). The storage unit 13 may function as, for example, a main storage device, an auxiliary storage device, or a cache memory. The storage unit 13 may store information on the result of analysis or processing by the control unit 11. The storage unit 13 may store various information and the like related to the operation or control of the control device 1. The storage unit 13 may store a system program, an application program, embedded software, and the like.

The storage unit 13 includes a sensor information database (DB). The sensor information is acquired from the sensor 24 of the vehicle 2. Specifically, as will be described later with reference to FIG. 5, the sensor information DB according to the present embodiment stores a user identification (ID), sensor information of the vehicle, and sensor information of the user terminal in association with a vehicle ID. The user ID is an ID of a user who uses the vehicle and is registered in advance. The sensor information of the vehicle is sensor information acquired from a sensor provided in the vehicle. The sensor information of the user terminal is the sensor information acquired from the sensor included in the user terminal.

The vehicle 2 includes any type of vehicles, such as a micromobility, a gasoline vehicle, a diesel vehicle, an HV, a PHV, an EV, or a FCV. The components of the vehicle 2 are communicably connected to each other through an in-vehicle network such as controller area network (CAN) or a dedicated line, for example. The term "HV" is an abbreviation for "hybrid vehicle". The term "PHV" is an abbreviation for "plug-in hybrid vehicle". The term "EV" is an abbreviation for "electric vehicle". The term "FCV" is an abbreviation for "fuel cell vehicle". The vehicle 2 may be autonomously driven at any given level. The level of autonomous driving is, for example, one of levels 1 to 5 in the SAE leveling, for example. The term "SAE" is an abbreviation for the "Society of Automotive Engineers". The vehicle 2 may be a MaaS dedicated vehicle. The term "MaaS" is an abbreviation for "mobility as a service". As an alternative, the vehicle 2 may be driven by a driver.

Figure 3:
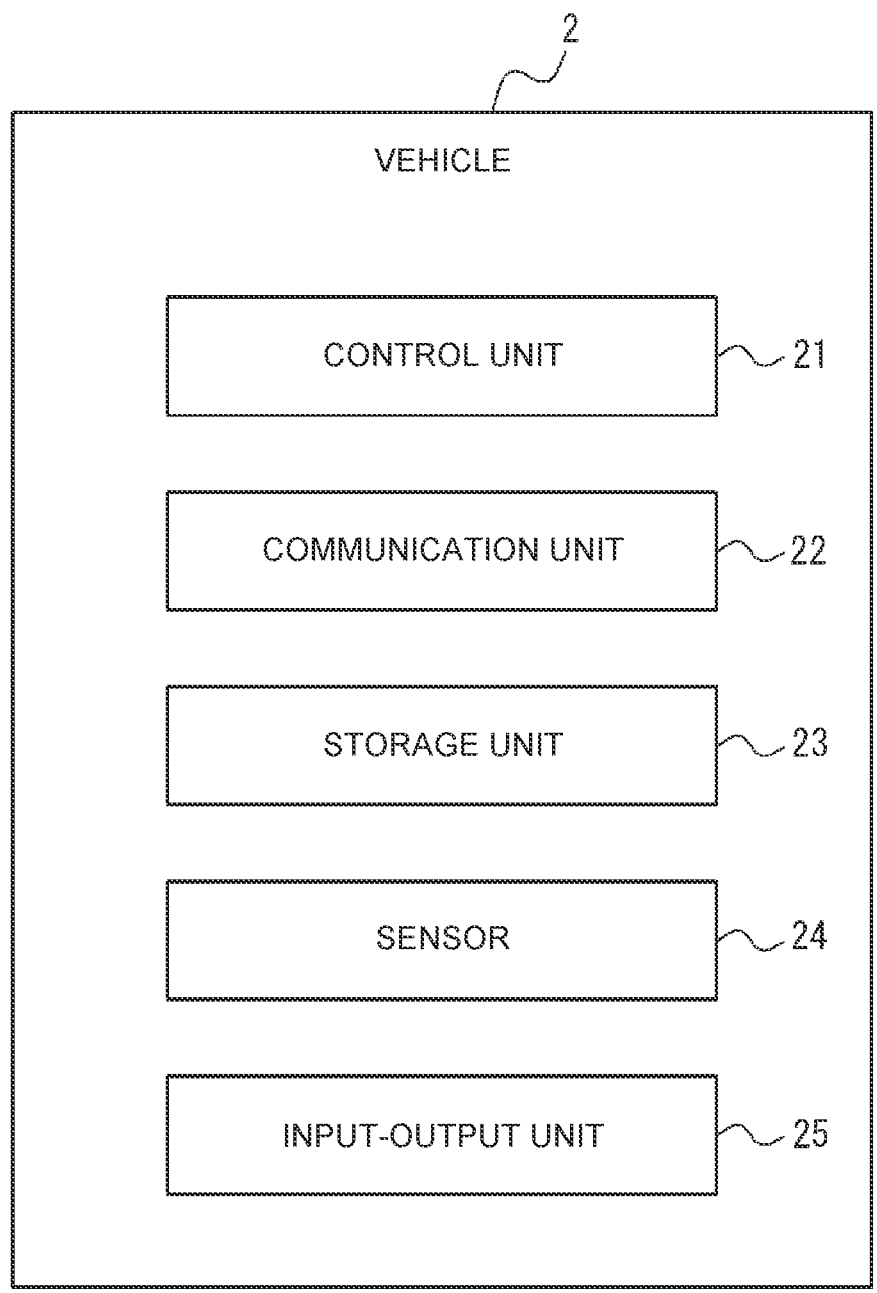
FIG. 3 is a block diagram showing a configuration of a vehicle.

The internal configuration of the vehicle 2 will be described in detail with reference to FIG. 3.

The vehicle 2 includes a control unit 21, a communication unit 22, a storage unit 23, a sensor 24, and an input-output unit 25. The components of the vehicle 2 are communicably connected to each other via, for example, a dedicated line.

The hardware configurations of the control unit 21, the communication unit 22, and the storage unit 23 of the vehicle 2 may be the same as the hardware configurations of the control unit 11, the communication unit 12, and the storage unit 13 of the control device 1, respectively. The description here is omitted.

The sensor 24 may include at least one of a seating sensor, a door open-close sensor, a vehicle height sensor, a seatbelt fastening detection sensor, an image sensor, a motion sensor, a speed sensor, and a position information sensor.

The position information sensor as the sensor 24 includes at least one GNSS receiver. The term "GNSS" is an abbreviation for "global navigation satellite system". The GNSS includes, for example, at least one of GPS, QZSS, BeiDou, GLONASS, and Galileo. The term "GPS" is an abbreviation for "global positioning system". The term "QZSS" is an abbreviation for "quasi-zenith satellite system". The satellites of the QZSS are referred to as quasi-zenith satellites. The term "GLONASS" is an abbreviation for "global navigation satellite system". The sensor 24 measures the position of the vehicle 2. The result of the measurement by the sensor 24 is acquired by the control unit 21 as the position information of the vehicle 2. The "position information" is information that can specify the position of the vehicle 2, and includes, for example, the coordinates of the vehicle 2.

The sensor 24 transmits the detected information to the control device 1 as the sensor information. The control device 1 can estimate whether the user U01 is staying in the vehicle 2 based on the sensor information using a method described later. The control unit 21 may store the sensor information in the storage unit 23 when the accessory power supply (ACC power supply) of the vehicle 2 is turned off, and transmit the sensor information to the control device 1 when the ACC power supply is turned on.

The input-output unit 25 includes at least one input interface. The input interface is, for example, a physical key, a capacitive key, a pointing device, a touch screen integrated with a display, or a microphone. The input-output unit 25 accepts an operation of inputting information used for the operation of the vehicle 2. The input-output unit 25 may be connected to the vehicle 2 as an external input device instead of being provided in the vehicle 2. As a connection method, for example, any method such as a USB, an HDMI (registered trademark), or Bluetooth (registered trademark) can be used. The term "USB" is an abbreviation for "universal serial bus". The term "HDMI (registered trademark)" is an abbreviation for "high-definition multimedia interface".

The input-output unit 25 includes at least one output interface. The output interface is, for example, a display or a speaker. The display is, for example, an LCD or an organic EL display. The term "LCD" is an abbreviation for "liquid crystal display". The term "EL" is an abbreviation for "electroluminescence". The input-output unit 25 outputs information obtained through the operation of the vehicle 2. The input-output unit 25 may be connected to the vehicle 2 as an external output device instead of being provided in the vehicle 2. As a connection method, for example, any method such as a USB, an HDMI (registered trademark), or Bluetooth (registered trademark) can be used.

Figure 4:
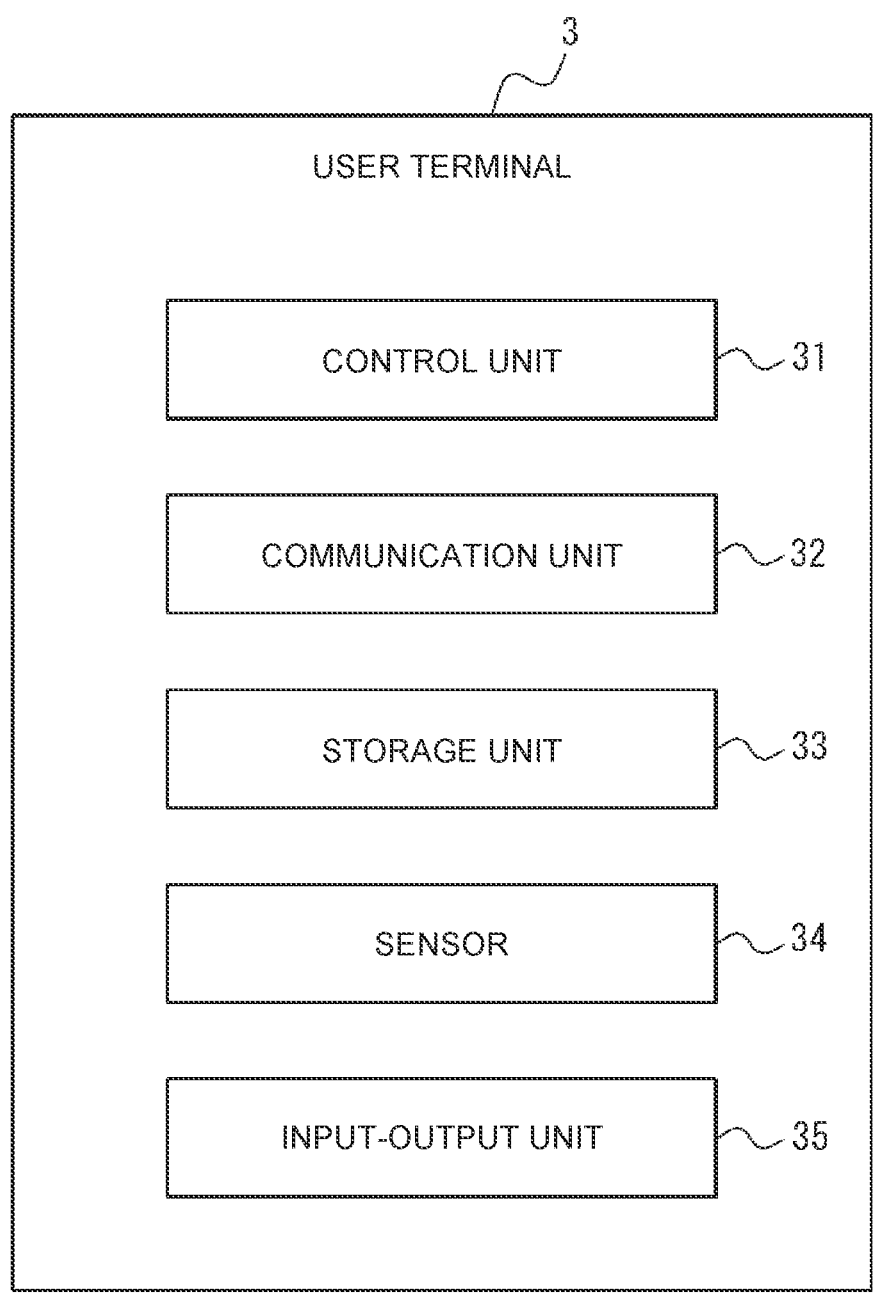
FIG. 4 is a block diagram showing a configuration of a user terminal.

The internal configuration of the user terminal 3 will be described in detail with reference to FIG. 4.

The user terminal 3 is a terminal operated by the user U01. The user terminal 3 is, for example, a mobile device such as a mobile phone, a smartphone, a wearable device, or a tablet.

The user terminal 3 includes a control unit 31, a communication unit 32, a storage unit 33, a sensor 34, and an input-output unit 35. The components of the user terminal 3 are communicably connected to each other via, for example, a dedicated line.

The hardware configurations of the control unit 31, the communication unit 32, the storage unit 33, the sensor 34, and the input-output unit 35 of the user terminal 3 may be the same as the hardware configurations of the control unit 21, the communication unit 22, the storage unit 23, the sensor 24, and the input-output unit 25 of the vehicle 2, respectively. The description here is omitted.

Hereinafter, the processes executed by the information processing system S according to the present embodiment will be described in detail. Here, as an example, a scene in which the control device 1 confirms whether there is a person staying in the vehicle 2 under an arbitrary situation such as a disaster will be described.

The control device 1 acquires the sensor information from the sensor 24. The control device 1 determines whether the vehicle 2 is parked based on the sensor information. The control device 1 determines that the vehicle 2 is parked in the following cases, for example.

When the speed information acquired from the speed sensor indicates that the speed of the vehicle 2 is zero.

When the position information of the vehicle 2 acquired from the position information sensor does not change.

In the example shown in FIG. 5, the sensor information of the vehicle 2 is "position L01". When the position does not change, the control device 1 determines that the vehicle 2 is parked.

The control device 1 determines whether the parking time of the vehicle 2 exceeds the first reference value. Specifically, the control device 1 measures the parking time by repeating the determination of whether the vehicle 2 is parked periodically or irregularly. The first reference value can be set arbitrarily.

The control device 1 determines whether the user U01 is staying in the vehicle 2 based on the sensor information. The control device 1 determines that the user U01 is staying in the vehicle 2 in the following cases, for example.

When information indicating that the user is seated on the seat of the vehicle 2 (for example, the driver's seat, the passenger seat, or the rear seat) is acquired from the seating sensor.

When information indicating that the door of the vehicle 2 is opened or closed is acquired from the door open-close sensor.

When information indicating that the height of the vehicle 2 has changed up and down is acquired from the vehicle height sensor.

When information indicating that the seatbelt of the vehicle 2 is used is acquired from the seatbelt fastening detection sensor.

When information indicating that the user U01 exists in the vehicle 2 is acquired from the image sensor.

When information indicating that the user U01 exists in the vehicle 2 is acquired from the motion sensor.

In the example shown in FIG. 5, the seating sensor of the vehicle 2 is on. In this case, the control device 1 determines that the user U01 is staying in the vehicle 2.

In addition, the control device 1 may determine the number of users staying in the vehicle 2 based on the sensor information. The control device 1 determines whether the determined number of people exceeds a third reference value corresponding to the vehicle class (for example, dimensions) of the vehicle 2. The third reference value may be arbitrarily set as an appropriate number of people staying in the vehicle. The appropriate number of people is stored in the storage unit 13 or the storage unit 23 in advance. When the control device 1 determines that the determined number of people exceeds the third reference value, the control device 1 may dispatch an accommodation vehicle or preferentially arrange an evacuation center for the excess number of people.

Additionally or alternatively, the control device 1 acquires the position information of the user terminal 3 from the sensor 34 of the user terminal 3. The control device 1 may determine that the user U01 stays in the vehicle 2 when the position information of the user terminal 3 and the position information of the vehicle 2 match each other.

The control device 1 determines whether the staying time of the user U01 exceeds the second reference value. Specifically, the control device 1 measures the staying time by repeating the determination of whether the user U01 is staying in the vehicle 2 periodically or irregularly. The second reference value can be set arbitrarily.

When the parking time of the vehicle 2 exceeds the first reference value and the staying time of the user U01 exceeds the second reference value, the control device 1 further executes estimation that the user U01 is staying in the vehicle 2.

When the control device 1 estimates that the user U01 is staying in the vehicle, the control device 1 notifies a supporter terminal that the user U01 is staying in the vehicle 2, together with the position information of the vehicle 2. The supporter terminal is communicably connected to the control device 1 via the network NW. The supporter terminal is a terminal operated by the supporter. The supporter may be, for example, a dealer, a municipality, a local resident, a government, or a local public entity.

When the control device 1 estimates that the user U01 is staying in the vehicle 2, the control device 1 may transmit in-vehicle stay support information as shown in FIG. 6 to the user terminal 3. The in-vehicle stay support information according to the present embodiment is information that supports the user U01 to stay in the vehicle 2. Specifically, the in-vehicle stay support information includes information indicating the congestion level of each evacuation center. The evacuation center may be an evacuation center within a predetermined distance from the vehicle 2. The in-vehicle stay support information is displayed on the input-output unit 35 of the user terminal 3. Additionally or alternatively, the in-vehicle stay support information may be output from a speaker as the input-output unit 35. The in-vehicle stay support information may be output from the speaker or a display unit as the input-output unit 25 of the vehicle 2.

The in-vehicle stay support information may include information indicating the distribution location of an in-vehicle stay kit. The in-vehicle stay kit may be bedding, power supply, lighting, meals, cooking utensils, etc. used when the user stays in the vehicle.

The user staying in the vehicle 2 may be active outside the vehicle 2 during the daytime. Therefore, the control device 1 may execute the process described above only at night (for example, the timeframe from 6:00 μm to 6:00 am in the next morning).

Figure 7:
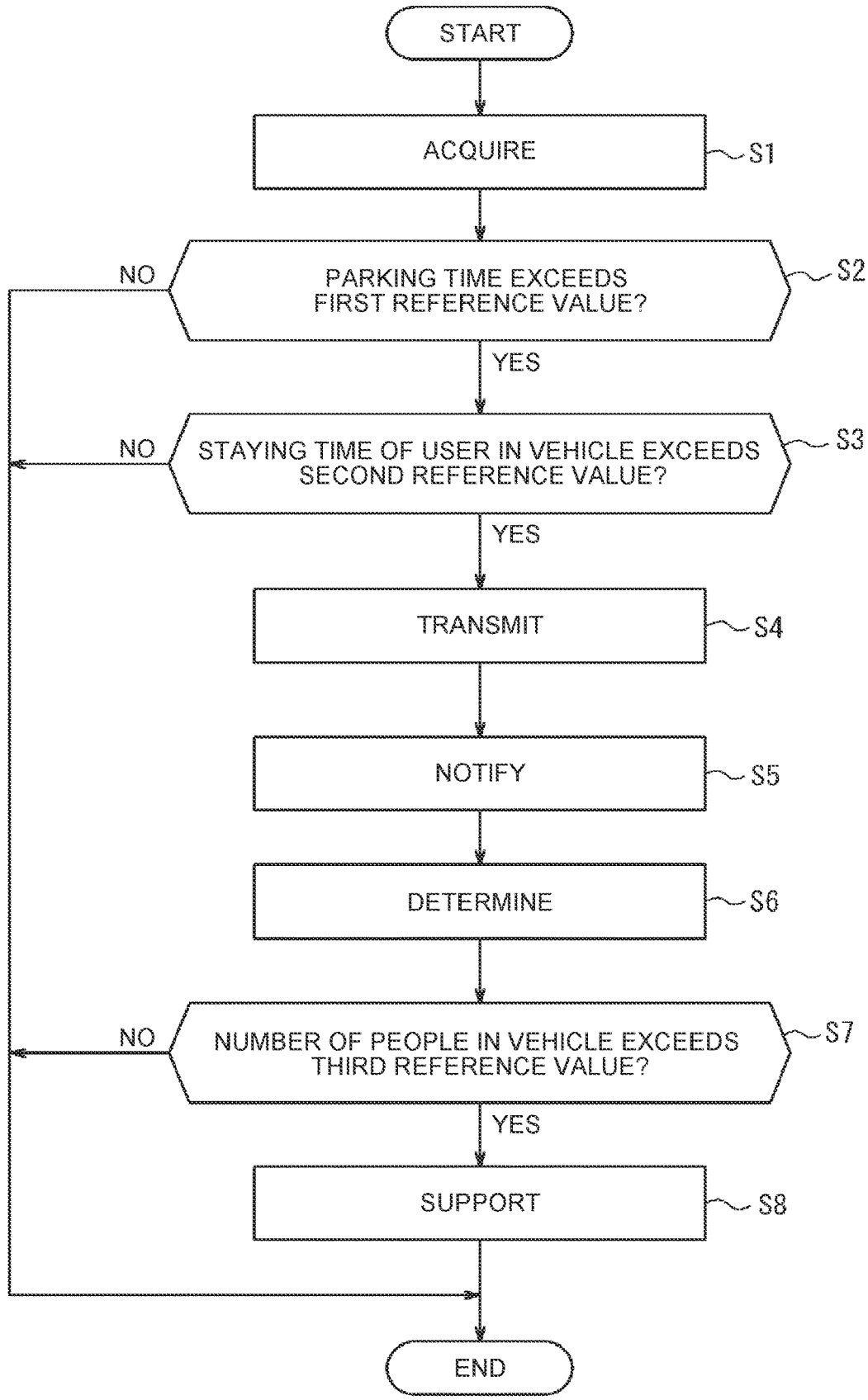
FIG. 7 is a flowchart showing operations of the control device.

A control method executed by the control device 1 according to the present embodiment will be described with reference to FIG. 7.

In step S1, the control device 1 acquires the sensor information from the sensor 24 provided in the vehicle 2.

In step S2, the control device 1 determines whether the vehicle 2 is parked based on the sensor information, and determines whether the parking time of the vehicle 2 exceeds the first reference value.

When the determination is No in step S2, the control device 1 ends the flow.

When the determination is Yes in step S2, the control device 1 executes step S3. In step S3, the control device 1 determines whether the user U01 is staying in the vehicle 2, and determines whether the staying time exceeds the second reference value.

When the determination is No in step S3, the control device 1 ends the flow.

When the determination is Yes in step S3, the control device 1 estimates that the user U01 is staying in the vehicle 2.

In step S4, the control device 1 transmits the in-vehicle stay support information to the user terminal 3 of the user U01.

In step S5, the control device 1 notifies the supporter terminal that the user U01 is staying in the vehicle 2, together with the position information of the vehicle 2.

In step S6, the control device 1 determines the number of users staying in the vehicle 2 based on the sensor information.

In step S7, the control device 1 determines whether the number of people in the vehicle 2 exceeds the third reference value.

When the determination is No in step S7, the control device 1 ends the flow.

When the determination is Yes in step S7, the control device 1 provides support for the number of users exceeding the third reference value. For example, the control device 1 may dispatch an accommodation vehicle or may preferentially arrange an evacuation center.

As described above, according to the present embodiment, the control device 1 executes acquisition of the sensor information from the sensor 24 provided in the vehicle 2, determination of whether the vehicle 2 is parked based on the sensor information, and determination of whether the user U01 is staying in the vehicle 2 based on the sensor information. When the parking time of the vehicle 2 exceeds the first reference value and the staying time of the user U01 exceeds the second reference value, the control device 1 further executes estimation that the user U01 is staying in the vehicle 2. With this configuration, the control device 1 determines whether the user is staying in the vehicle from two viewpoints related to the in-vehicle stay, that is, the parking time and the staying time. Therefore, the person who is staying in the vehicle can be found with high accuracy.

Further, according to the present embodiment, the control unit 11 acquires the sensor information from at least one of the speed sensor and the position information sensor as the sensor 24, and determines whether the vehicle 2 is parked based on the acquired sensor information. With this configuration, the control device 1 can determine whether the vehicle 2 is parked with higher accuracy.

Further, according to the present embodiment, the control unit 11 acquires the sensor information from at least one of the seating sensor, the door open-close sensor, the vehicle height sensor, the seatbelt fastening detection sensor, the image sensor, and the motion sensor as the sensor 24, and determines whether the user U01 is staying in the vehicle 2 based on the acquired sensor information. With this configuration, the control device 1 can determine whether the vehicle 2 is parked with higher accuracy.

Further, according to the present embodiment, the control unit 11 acquires the sensor information from at least one of the seating sensor, the door open-close sensor, the vehicle height sensor, the seatbelt fastening detection sensor, the image sensor, and the motion sensor, and determines the number of users staying in the vehicle 2. With this configuration, the control device 1 can provide appropriate support or the like in accordance with the determined number of people.

Further, according to the present embodiment, when the control unit 11 estimates that the user U01 is staying in the vehicle, the control unit 11 may transmit in-vehicle stay support information to the user terminal 3. With this configuration, the control device 1 can support a large number of people staying in the vehicle and ensure their health and safety.

Further, according to the present embodiment, when the control unit 11 estimates that the user U01 is staying in the vehicle 2, the control unit 11 notifies the supporter terminal that the user U01 is staying in the vehicle 2, together with the position information of the vehicle 2. With this configuration, the control device 1 can notify the supporter of the existence of the user U01 who is staying in the vehicle 2. Therefore, the supporter can distribute food or supplies, provide information, provide insurance or medical services, and the like.

Further, according to the present embodiment, the control unit 11 may determine that the user U01 is staying in the vehicle 2 when the position information of the user terminal 3 and the position information of the vehicle 2 match each other. With this configuration, the control device 1 can determine whether the user U01 is staying in the vehicle 2 with higher accuracy.

Although the present disclosure has been described above based on the drawings and the embodiment, it should be noted that those skilled in the art may make various modifications and alterations thereto based on the present disclosure. Other changes may be made without departing from the scope of the present disclosure. For example, the functions included in each step can be rearranged so as not to be logically inconsistent, and a plurality of steps can be combined into one or divided.

For example, in the above embodiment, a program that executes all or a part of the functions or processes of the control device 1 can be recorded in a computer-readable recording medium. The computer-readable recording medium includes a non-transitory computer-readable medium, such as a magnetic recording device, an optical disc, a magneto-optical recording medium, or a semiconductor memory. The distribution of the program is carried out, for example, by selling, transferring, or renting a portable recording medium such as a digital versatile disc (DVD) or a compact disc read only memory (CD-ROM) on which the program is recorded. Further, distribution of the program may be performed by storing the program in a storage of an arbitrary server and transmitting the program from the arbitrary server to another computer. Further, the program may be provided as a program product. The present disclosure can also be realized as a program that can be executed by a processor.

The computer temporarily stores the program recorded in the portable recording medium or the program transferred from the server in the main storage device, for example. The computer then causes the processor to read the program stored in the main storage device, and causes the processor to perform processes in accordance with the read program. The computer may read the program directly from the portable recording medium and perform processes in accordance with the program. The computer may perform the processes in accordance with the received program each time the program is transferred from the server to the computer. The processes may be performed by a so-called ASP service that realizes the function only by execution instruction and result acquisition without transferring the program from the server to the computer. The term "ASP" is an abbreviation for "application service provider". The program includes information that is used for processing by electronic computers and equivalent to a program. For example, data that is not a direct command to a computer but has the property of defining the processing of the computer corresponds to the "data equivalent to a program".

What is claimed is:

1. A control device that is communicably connected to a vehicle, the control device comprising a processor, the processor executes:
   acquisition of sensor information from a provided in the vehicle;
   determination of whether the vehicle is parked based on the sensor information;
   determination of whether a user is staying in the vehicle based on the sensor information;
   estimation that the user is staying in the vehicle when a parking time of the vehicle exceeds a first reference value and a staying time of the user exceeds a second reference value, the parking time of the vehicle being different than the staying time of the user;
   determination of a number of users staying in the vehicle based on the sensor information;
   determination of whether the determined number of users exceeds a third reference value corresponding to a vehicle class; and
   dispatch, based on the determination of whether the determined number of users exceeds the third reference value, of an accommodation vehicle or arrangement of an evacuation center for an excess number of users.

2. The control device according to claim 1, wherein the processor acquires the sensor information from at least one of a speed sensor and a position information sensor as the sensor, and determines whether the vehicle is parked based on the acquired sensor information.

3. The control device according to claim 1, wherein when the processor estimates that the user is staying in the vehicle, the processor transmits in-vehicle stay support information to a user terminal of the user.

4. The control device according to claim 1, wherein when the processor estimates that the user is staying in the vehicle, the processor notifies a supporter terminal that the user is staying in the vehicle, together with position information of the vehicle.

5. The control device according to claim 1, wherein:
   the control device is communicably connected to a user terminal of the user; and
   the processor determines that the user is staying in the vehicle when position information of the user terminal and position information of the vehicle match each other.

6. The control device according to claim 1, wherein the processor is configured to measure the parking time by repeatedly determining whether the vehicle is parked periodically or irregularly.

7. The control device according to claim 3, wherein in-vehicle stay support information includes information indicating a congestion level of the evacuation center within a predetermined distance from the vehicle.

8. A vehicle equipped with the control device according to claim 1.

9. A non-transitory program that causes a computer, as a control device that is communicably connected to a vehicle, to execute:
   acquisition of sensor information from a sensor provided in the vehicle;
   determination of whether the vehicle is parked based on the sensor information;
   determination of whether a user is staying in the vehicle based on the sensor information;
   estimation that the user is staying in the vehicle when a parking time of the vehicle exceeds a first reference value and a staying time of the user exceeds a second reference value, the parking time of the vehicle being different than the staying time of the user;
   determination of a number of users staying in the vehicle based on the sensor information;
   determination of whether the determined number of users exceeds a third reference value corresponding to a vehicle class; and
   dispatch, based on the determination of whether the determined number of users exceeds the third reference value, of an accommodation vehicle or arrangement of an evacuation center for an excess number of users.

10. The non-transitory program according to claim 9, wherein the computer is further caused to execute an operation to acquire the sensor information from at least one of a speed sensor and a position information sensor as the sensor, and an operation to determine whether the vehicle is parked based on the acquired sensor information.

11. The non-transitory program according to claim 9, wherein the computer is further caused to execute, when the user is estimated to be staying in the vehicle, an operation to transmit in-vehicle stay support information to a user terminal of the user.

12. The non-transitory program according to claim 9, wherein the computer is further caused to execute, when the user is estimated to be staying in the vehicle, an operation to notify a supporter terminal that the user is staying in the vehicle, together with position information of the vehicle.

13. The non-transitory program according to claim 9, wherein the computer is further caused to execute an operation to measure the parking time by repeatedly determining whether the vehicle is parked periodically or irregularly.

14. The non-transitory program according to claim 11, wherein in-vehicle stay support information includes information indicating a congestion level of the evacuation center within a predetermined distance from the vehicle.

15. A control method executed by a control device that is communicably connected to a vehicle, the control method comprising:
- acquiring sensor information from a sensor provided in the vehicle;
- determining whether the vehicle is parked based on the sensor information;
- determining whether a user is staying in the vehicle based on the sensor information;
- estimating that the user is staying in the vehicle when a parking time of the vehicle exceeds a first reference value and a staying time of the user exceeds a second reference value, the parking time of the vehicle being different than the staying time of the user;
- determining a number of users staying in the vehicle based on the sensor information;
- determining whether the determined number of users exceeds a third reference value corresponding to a vehicle class; and
- dispatching, based on the determination of whether the determined number of users exceeds the third reference value, an accommodation vehicle or arranging an evacuation center for an excess number of users.

16. The control method according to claim 15, further comprising acquiring the sensor information from at least one of a speed sensor and a position information sensor as the sensor and determining whether the vehicle is parked based on the acquired sensor information.

17. The control method according to claim 15, further comprising transmitting in-vehicle stay support information to a user terminal of the user when the user is estimated to be staying in the vehicle.

18. The control method according to claim 15, further comprising notifying a supporter terminal that the user is staying in the vehicle, together with position information of the vehicle, when the user is estimated to be staying in the vehicle.

19. The control method according to claim 15, further comprising measuring the parking time by repeatedly determining whether the vehicle is parked periodically or irregularly.

20. The control method according to claim 17, wherein in-vehicle stay support information includes information indicating a congestion level of the evacuation center within a predetermined distance from the vehicle.

* * * * *